United States Patent [19]

Fengler

[11] 4,423,332

[45] Dec. 27, 1983

[54] PORTABLE SOLID FUEL ELECTRIC POWER PLANT FOR ELECTRICAL POWERED VEHICLES

[76] Inventor: Werner H. Fengler, 23651 Fordson Dr., Dearborn, Mich. 48124

[21] Appl. No.: 214,848

[22] Filed: Dec. 10, 1980

Related U.S. Application Data

[63] Continuation-in-part of Ser. No. 13,984, Feb. 22, 1979, abandoned.

[51] Int. Cl.$^3$ .................. F02C 3/26; H02P 9/04
[52] U.S. Cl. .................. 290/45; 60/39.21; 60/39.29; 60/39.464; 180/65 B; 290/50
[58] Field of Search .................. 180/65.2–65.4; 60/39.21, 39.46 S, 39.29, 39.37, 39.38; 290/45, 50

[56] References Cited

U.S. PATENT DOCUMENTS

| | | | |
|---|---|---|---|
| 2,390,959 | 11/1945 | Pfenninger | 60/726 |
| 2,651,176 | 9/1953 | Yellott | 60/39.46 |
| 2,928,242 | 3/1960 | Guentaer | 60/39.39 |
| 3,119,436 | 1/1964 | Rydberg | 60/39.76 |
| 3,606,867 | 9/1971 | Briffa | 60/39.76 |
| 3,867,812 | 2/1975 | Van Arsdel | 60/39.63 |
| 4,148,186 | 4/1979 | Virr | 60/39.46 |
| 4,152,890 | 5/1979 | Weiland | 60/39.46 |
| 4,187,436 | 2/1980 | Etienne | 290/50 |

FOREIGN PATENT DOCUMENTS

| | | | |
|---|---|---|---|
| 24591 | of 1906 | United Kingdom | 60/39.29 |

*Primary Examiner*—B. Dobeck
*Assistant Examiner*—Shelley Wade
*Attorney, Agent, or Firm*—Brooks & Kushman

[57] ABSTRACT

Combustion of fragmented slow-burning solid fuel, such as wood fragments, in the combustion chamber of a portable combustion receptacle or pressure vessel mounted on the rear of a hybrid vehicle, is initiated by igniting in the combustion chamber combustible starting fluid gas, such as propane gas from an external source and ignited by a glow plug. Air is supplied by an air compressor driven by a prime mover such as a turbine or electric motor. As soon as combustion of the solid fuel has become self-sustaining, the supplying of this starting gas is terminated. Meanwhile, the pressurized gas emitted from the burning solid fuel in the combustion receptacle is discharged into a power turbine by way of a controlled throttle valve. The output shaft of the turbine drives a speed-reducing transmission which in turn drives an alternator of my electric vehicle propulsion system identified herein.

12 Claims, 3 Drawing Figures

PORTABLE SOLID FUEL ELECTRIC POWER PLANT FOR ELECTRICAL POWERED VEHICLES

This application is a continuation-in-part application of my prior co-pending application Ser. No. 13,984, filed Feb. 22, 1979 now abandoned.

BACKGROUND ART

In my U.S. Pat. No. 4,211,930 issued July 8, 1980 there is disclosed an electrical vehicle propulsion system utilizing individual stepping motors, each connected to a traction wheel of a motor vehicle. The stepping motors receive electric current from an alternator driven by a continuously-running Diesel or turbine internal combustion engine (shown in FIG. 1 as block #12) which utilizes liquid fuel such as gasoline or fuel oil.

Many internal combustion engines waste a considerable amount of energy through the dissipation of heat through radiators. Likewise, a considerable amount of energy is lost through the exhaust manifold of the internal combustion engine, when operated with liquid fuels.

In view of the greater and greater scarcity of such liquid fuels, there is a likelihood that such fuels will only be obtained, if at all, at prohibitively high costs. The portable electric power plant of my present invention drives the alternator of my prior system from a gas turbine receiving power gas from a portable combustion receptacle or pressure vessel in the combustion chamber of which suitably subdivided slow-burning solid fuel, such as wood, is burned to produce such power and expanded power gas.

During World War II one hundred thousand trucks were powered by solid fuel operated woodgas generators in Sweden and Germany.

DISCLOSURE OF THE INVENTION

This invention resides primarily in the provision of using a combustible starting gas, such as propane, to ignite quickly solid fuel particles, fragments or blocks, preferably of wood. The propane gas is controllably ignited through a glow plug and subsequently terminated when the combustion of the solid fuel particles in the portable combustion receptacle and pressure vessel becomes self-sustaining. The invention further resides in the provision of the turbine-powered alternator controllably driven by the pressurized hot output power gas from the combustion chamber of the combustion receptacle. The electricity thus generated is supplied to a place of utilization, such as an electric vehicle propulsion system including individual stepping motors drivingly connected to the vehicle wheels in accordance with my above-mentioned U.S. Pat. No. 4,211,930. The invention still further resides in the provision of duplex combustion receptacles, utilized alternately, for enabling continuous operation to be effected by having one such solid fuel filled combustion receptacle always held in reserve for use when the other combustion receptacle has exhausted its fuel supply.

BEST MODE FOR CARRYING OUT THE INVENTION

Figure 1:
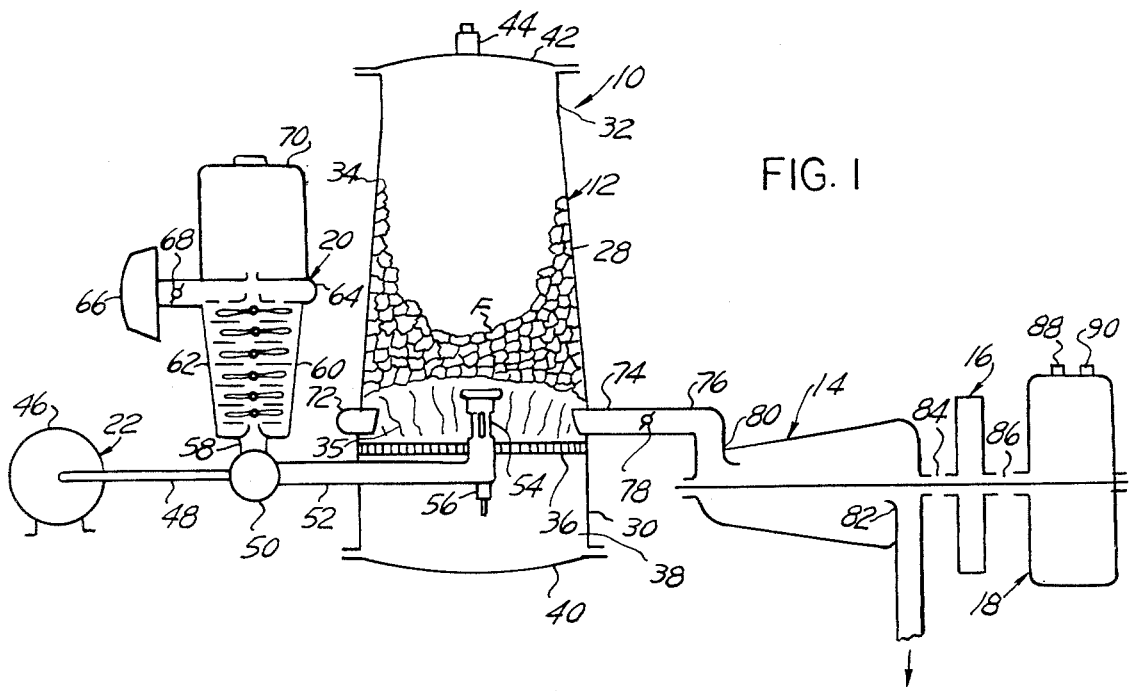
FIG. 1 is a diagrammatic side elevation of a portable solid fuel electric power plant for electrical powered vehicles according to a preferred form of the invention.
Figure 2:
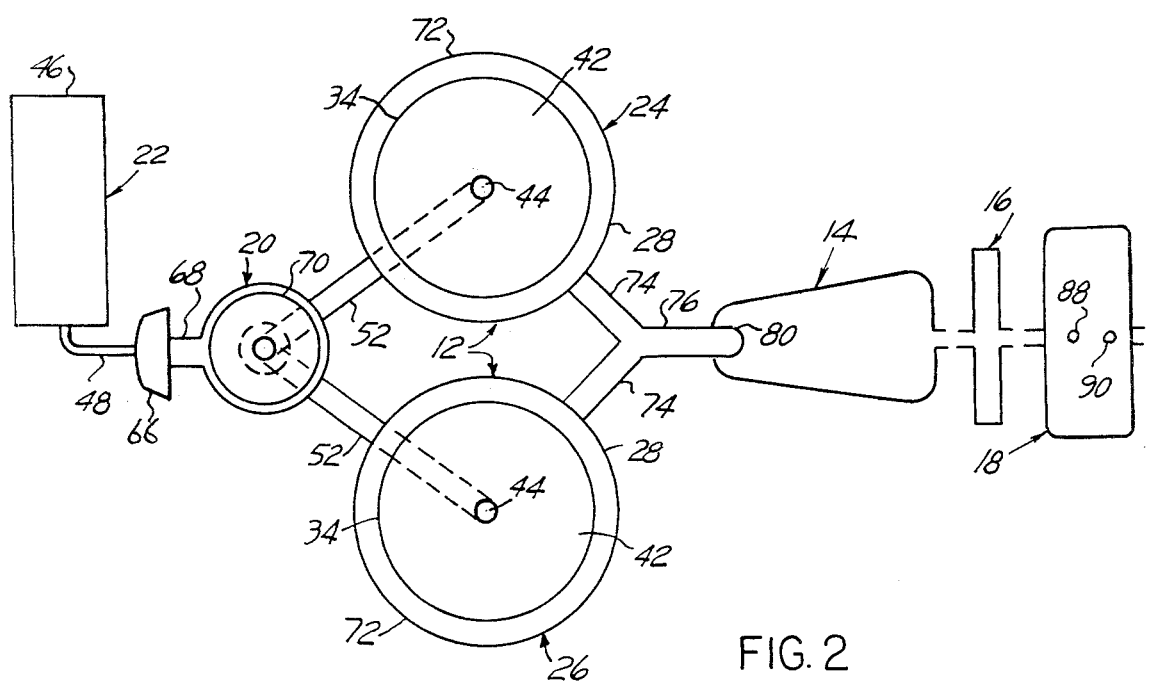
FIG. 2 is a diagrammatic top plan view of the power plant shown in FIG. 1.

Referring to the drawings in detail, FIGS. 1 and 2 show a portable solid fuel electric power plant, generally designated 10, consisting generally of a duplex combustion unit 12 adapted to contain and burn the combustible solid fuel F, such as wood blocks or fragments, and to deliver the hot power gas therefrom to a power turbine 14 which drives, through a reduction gear set 16, an alternator 18 which produces the electric current desired. Compressed air for aiding and accelerating the combustion of the solid fuel F is provided by a power-driven air compressor, generally designated 20, connected to the combustion unit 12. Combustible starting fluid, such as propane, for initiating combustion of the solid fuel F is supplied by a combustible gas supply unit 22, also connected to the combustion unit 12.

The duplex combustion unit 12 consists of two identical single combustion units 24 and 26, only one of which is placed in operation at a given time, the other such unit being filled with solid fuel F and held in reserve until combustion has used up substantially all of the solid fuel F in the other single combustion unit, whereupon the second combustion unit is placed in operation and the first combustion unit is filled with solid fuel F at the next opportunity. Each combustion unit 24 or 26 consists of a vertically-elongated combustion receptacle or combustion pressure vessel 28 of heat resistant material, such as steel, with cylindrical lower and upper walls 30 and 32 of different diameters joined to one another by a frusto-conical intermediate wall 34 and enclosing a combustion chamber 35. A circular grate 36 is mounted between the walls 30 and 32 at their junction, the lower wall 30 thus providing an ash receiver 38 closed by a bottom wall 40. The lower wall 30 is flanged at its lower end for the attachment of the bottom wall 40. To simplify the showing the combustion receptacle 28 is shown as single-walled whereas in actual practice it would be lined with a suitable refractory material such as fire clay for heat resistance and also surrounded by fire-resistant insulating material (not shown) for insulation.

The upper end of the upper wall 32 is flanged for the reception of a top plate or cover plate 42. Like the walls 34 and 32, the top wall 42 is also preferably double-walled and preferably lined with refractory material, such as fire clay for heat resistance and insulation. The top wall 42 is centrally apertured for the reception of a pressure relief valve 44. The bottom wall 40 is clamped to the lower wall 30 by any suitable clamping means and is preferably hinged or otherwise pivoted or slidably mounted by conventional means to enable the ashes to be dumped from the ash receiver 38 into a suitable ash pit at the location of the fuel replenishment station. The solid fuel F is preferably wood fragments which are ordinarily waste products of saw mills or other lumber producing or working establishments, "Hog-fuel" chips being a common example of such subdivided or particulate wood. Such subdivided or fragmented wood contains a great amount of latent energy which is released slowly rather than explosively during combustion in a steady flow of hot power gas. Combustion is initiated by a combustible starting fluid, such as propane, contained in a tank 46 and supplied through a conduit 48 and a conventional control and check valve 50 and thence by two conduits 52 (FIG. 2) to duplex burners 54 below each of which is a spark plug 56 connected by a conventional conductor cable (not shown) to a conventional source of high tension electricity (not shown) or a platinum wire glow plug 820 (FIG. 3) similar to ones used in gas appliances.

Also connected to the control and check valve 50 is the outlet or discharge duct 58 of the frusto-conical casing 60 of the compressor 62 at the lower end of the power-driven air compressor 20. The upper end of the casing 62 is joined to the intake duct 64 thereof and receives air through an intake filter 66 by way of an air throttle valve 68. Mounted on the upper end of the air compressor casing 60 and air intake duct 64 is the air compressor drive motor 70 which may consist, for example, of an electric which may consist, for example, of an electric motor or turbine.

Encircling the lower end of the intermediate wall 34 of each combustion unit 24 or 26 is a power gas discharge conduit or manifold 72, each of which opens into an outlet conduit 74 which, in turn, discharges the power gas into a joint discharge conduit 76 containing a power gas throttle valve 78. The joint discharge conduit 76 is connected to the intake portion 80 at one end of the conventional power gas turbine 14. The power gas, after passing through the power turbine 14 and imparting rotation to its successive rotors and between its intervening stators (not shown) emerges at its exhaust portion 82 at the opposite ends of the turbine 14. This action imparts rotation to the shaft 84 extending between the power turbine 14 and the reduction gear set 16. This gear set 16 may consist, for example, of that gear set disclosed in my U.S. Pat. No. 4,155,276. The output shaft 86 of the reduction gear box 16 extends therefrom to the two-phased alternator 18 which generates a 400-cycle or higher alternating current in response to the rotation of the shaft 86. The alternating current generated as a result of this action is delivered from output terminals 88 and 90 through suitable conductor cables to the place of utilization such as, for example, to the distribution circuit of my U.S. Pat. No. 4,211,930 entitled "Vehicle Propulsion System by Individual Stepping Motors from Continuously-Running-Engine-Driven Alternators And/Or Pulsating Battery Circuit".

The operation of the portable solid fuel electric power plant of the present invention is believed to be self-evident from the foregoing description of its construction and arrangement. In one of its intended uses, the components of this power plant are mounted on the vehicle to be propelled, with the duplex combustion unit 12 mounted on the rearward end thereof where the surplus heat will be dissipated most effectively. Each of the combustion receptacles 28 is filled with solid fuel F, preferably a mainly cellulose material in the form of subdivided wood fragments, wood blocks or "Hogfuel" chips. The tank 46 of the combustible starting gas supply unit 22 is filled with the combustible starting gas such as propane or other suitable combustion-initiating substance, and the drive motor 70 of the air compressor 20, having been connected to the vehicle storage batteries, is set in operation. Compressed air is discharged by the air compressor 60 through the outlet duct 58 and control and check valve 50 to the conduit 52 of the combustion unit 24 or 26 to be initially used, with the other combustion unit 26 or 24 temporarily shut off and held in reserve. The glow plug 820 is energized to ignite the starting gas flowing through the particular conduit 52 which is intended to be used at the moment, causing the burner 54 thereof to emit flames from the thus-ignited starting gas. These flames, in turn, ignite the solid fuel F which, when sufficiently ignited to be self-sustaining in combustion, no longer requires the supplying of the starting gas from the tank 46, whereupon the supply thereof to the conduit 48 is terminated.

Meanwhile, the hot combustion power gas emitted by the burning solid fuel F is discharged through the power gas discharge conduit 72 and thence through the outlet conduit 74 into the joint discharge conduit 76 past the power gas throttle valve 78 into the intake portion 80 of the power gas turbine. This action by the thrust of the hot combustion power gas between the blades or vanes of the successive rotors and the stators imparts rotation at high speed to the shaft 84 connecting the power gas turbine 14 to the reduction gear set 16. The latter reduces the speed of rotation to that required for operating the alternator 18, which thereupon delivers 400-cycle alternating current to its output terminals 88 and 90 for further transmission to the place of utilization mentioned above.

More particularly, and with reference to FIG. 3, in the propulsion of an electric vehicle the operation of the portable, solid-fuel, electric power plant is as follows: When the driver gets into the car, he turns the ignition key to close switch 800, whereupon the valve 50 controlled by a starting control circuit 801 opens to let propane gas flow from the tank 46 into the combustion chamber 35. This is now ignited by the glow plug 820 and burns the wood chips until the pressure in the combustion chamber 35 reaches approximately 10 P.S.I. After reaching this pressure, the throttle 68 opens and the compressor drive motor 70, starts the compressor 62 under control of a compressor control circuit 803. The compressor 62 blows enough air into the combustion receptacle 28 to admit sufficient oxygen in order to continue the burning process of the wood. The propane burner 54 is then shut off by the starting control circuit 801 when the combustion becomes self-sustaining.

Figure 3:
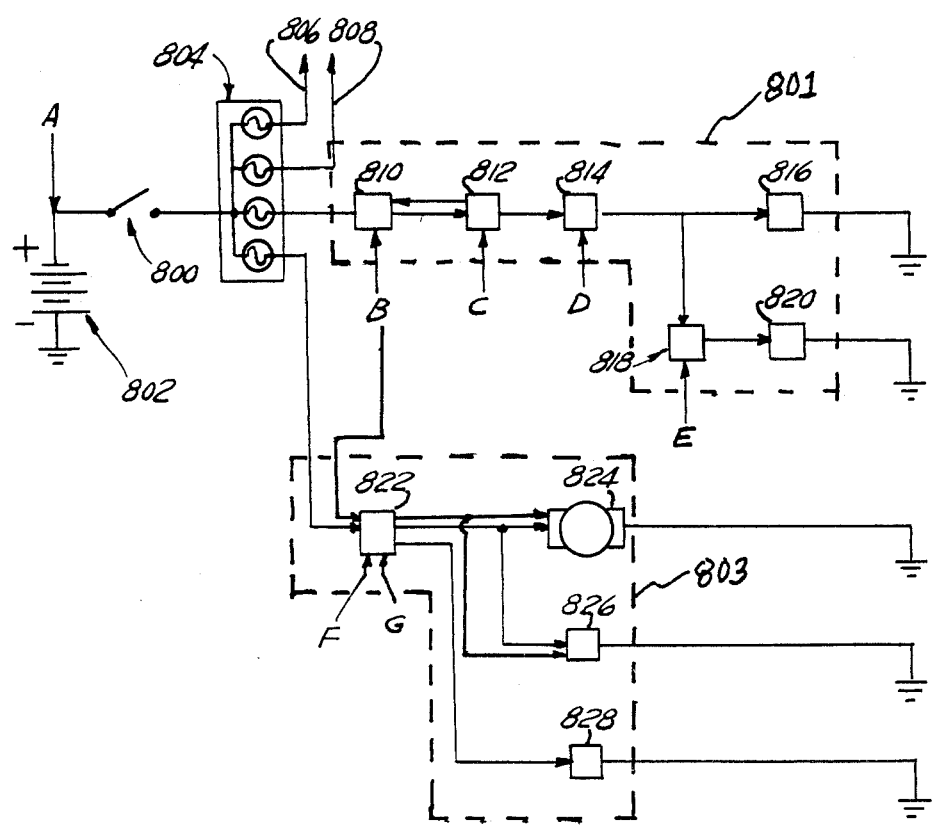
FIG. 3 is a diagram of the relays, actuators, electrical interconnections and wiring necessary to safely and controllably operate the power plant.

Both the starting and compressor control circuits 801 and 803 contain several safety features, which are shown in detail in FIG. 3. When the switch 800 is closed, the current from the rechargeable battery 802 (48 in U.S. Pat. No. 4,211,930) which is being charged through input A, (i.e. battery charger 42 of U.S. Pat. No. 4,211,930 is used to activate all starting circuits for the combustion chamber to drive the turbine). The current goes through a fuse in fuse block 804 to the gas flow sensing unit 810 which includes a pressure-sensitive relay which is normally closed. The gas flow sensing unit 812 senses the flow of gas from the container 46. The current then goes to a timer 812 which is thereby activated and when its input C (i.e. from the sensing unit 810) indicates that no gas flows from the propane gas container 46 for 5-10 seconds, timed by timer 812, the relay of the unit 810 is activated by the timed out timer 812 to interrupt all operations controlled by the control circuit 801. The relay of the unit 810 must be reset by hand, after a full bottle of propane gas has been installed.

Now the reset (and normally closed) relay of the unit 810 restarts and timer 812 again. The timer 812 receves, on its input C, the indication that the gas is flowing and stays in its normally closed position. From the timer 812 the current flows to a high heat-sensitive relay 814. This relay 814 is normally closed, and allows a low heat-sensitive relay 818 to heat the glow plug 820 when closed, the relay 814 also activates a valve actuator 816 which, in turn, opens its valve 50 for the propane gas.

Should the high heat-sensitive relay 814 sense an excessive temperature in the combustion chamber 35 at its input D, the relay 814 will open to shut off the propane gas, thereby keeping only sufficient gas flowing until pressure has been built up to start the compressor control circuit 803 as is discussed in greater detail hereinbelow.

When the heat in the combustion chamber 35 indicates through an input E to the low heat-sensitive relay 818 that the propane gas has lit and that it has developed enough heat, so that the glow plug 820 is not needed anymore, the relay 818 shuts the glow plug 820 off by opening the circuit to the glow plug 820. When the wood chips have caught fire from the flame of the propane gas, and the fire becomes self-sustaining, a pressure input B to the pressure-sensitive relay of the unit 810 opens the normally closed relay and the whole starting control circuit 801 is shut off. At the same time the pressure input B to a first pressure-sensitive relay of a relay unit 822 takes over and the compressor control circuit 803 starts with reduced air input to fan the ignited wood chips until the minimum pressure of 60 P.S.I. for the turbine has been reached.

The relay unit 822 also has a second pressure-sensitive relay having high and low pressure settings for the full power output of the compressor 62. The second pressure-sensitive relay also opens an actuator 826, which allows air into the compressor 62 through the throttle 68, while the escape of pressure-gas is stopped when the compressor 62 is not operating by closing the throttle 68.

A third relay of the relay unit 822 has the function of operating an actuator 828 of the throttle 78. The third relay of the relay unit 822 allows the heated gas from the combustion chamber 35 into the power turbine 14 through the throttle 78. This third relay is responsive to an input G to the unit 822 which comes from the battery charge monitor (50 of U.S. Pat. No. 4,211,930) and which indicates that the battery 802 is fully charged.

The relay unit 822 operates as follows: When the pressure in the combustion chamber 35 reaches 100 P.S.I. an input F to the second relay of the unit 822 opens the relay circuit and shuts off both the motor circuit 824 of the drive motor 70 and the compressor 62. The second relay also closes the actuator 826 which closes the throttle 68 thereby not admitting additional air into the compressor 62, as well as preventing loss of pressure from the combustion chamber.

As soon as the pressure has dropped to 60 P.S.I., the second relay of the relay unit 822 closes the circuit again, and energizes the motor circuit 824, as well as opening the throttle 68 through the actuator 826. Should it not be satisfactory to relay alone on the pressure differential, a mini-computer can control the operation of the compressor 62 in "time"; for instance, 5 second "on" and 15 seconds "off". When the battery 802 is being charged by the two-phase alternator 18 and becomes full or fully charged, the third relay of the relay unit 822 will shut off the compressor 62 and the drive motor 70 through input G. The output from the alternator 18 can also control the position of the throttle 78 for the turbine 14, for a 40 mile per hour vehicle speed, and range to a maximum speed of 55 miles per hour. This will act as a governor and keep the alternator 18 from "running away" in its speed.

From the fuse block 804 a line 806 secured through a fuse goes to the switch, which controls the lights of the vehicle. Another line 808 also secured through a fuse goes to the control circuits of my U.S. Pat. No. 4,211,930. Even if this slow firing-up procedure for the solid fuel power plant introduces a time lag of 10 to 15 minutes, the driver meanwhile can start the car and propel it temporarily with battery power, hence will not be required to wait.

As soon as the pressure through the threefold expanding hot air has reached the required level (i.e. 60 P.S.I.) and the opening of the main or power throttle 78 through actuator 828 allows the full power output of the power turbine 18, the alternator 18 is cut in and thereupon generates its 300–400 cycle two-phase alternating current to help accelerate the car to full speed, as explained in my U.S. Pat. No. 4,211,930. As soon as full speed is reached, the battery current for temporary propulsion is shut off. The alternator 18 and the four stepping motors are so sized that they can overcome the rolling and wind resistance of the car. As explained in my U.S. Pat. No. 4,211,930, when the vehicle is decelerating, the energy of deceleration will be recuperated and will flow into the battery. When the vehicle is stopping or waiting at a traffic signal, the full output of the alternator 18 will quickly recharge the vehicle propulsion battery so that the battery power thereof can be subsequently used for accelerating the vehicle.

The air compressor 62 and its drive motor 70 are completely detached from the power turbine 14. Their duty is solely to admit the necessary oxygen into the combustion zone and to maintain a certain predetermined pressure in the combustion chamber 35, and in the adjacent combustion receptacle or pressure vessel 28, for example 100 P.S.I. When this pressure is reached, the second relay of the relay unit 822 closes off the valve 68 through the actuator 826 in the air intake 66 of the compressor as well as turning off the motor circuit 824 of the motor 70 so that at this time no air is pumped into the combustion chamber 35. When the pressure in the combustion chamber 35 has decreased to the lowest permissible P.S.I. (i.e. 60 P.S.I.) the motor circuit 824 of the drive motor 70 is turned on again, as well as opening the throttle 68 at the air intake of the air compressor. Air is thereupon pumped into the combustion chamber 35, thus adding oxygen thereto, and through the concurrent burning of the wood particles, pieces or blocks, the pressure is again raised at least to the designed 80 P.S.I. For example, let it be assumed that while varying loads are imposed on the alternator 18, the minicomputer controls the speed of the compressor 62 or expressed in "time" in "on/off", while driving at 50 m.p.h. the compressor unit 20 pumps air into the combustion chamger 35 for about five seconds, and then closes for about 15 seconds. Under these circumstances, the fuel wood F in the combustion chamber 35 remains hot but it does not burn.

Even the water content of wood is not a drawback to this power plant because such water is evaporated at 100 P.S.I. to produce steam, which assists the hot power gas in turning the rotor of the power turbine 14. Moreover, the quality of the wood used as the fuel F is not important. All kinds of wood can be used, even branches, tree stumps, dead wood, in fact any burnable part of the tree, soft and hard wood. For convenience of handling, the wood fuel may be cut into small blocks of about four inches square. Such wood may also be bagged, like charcoal for backyard grilles.

When the retail price of scrap wood is converted into British thermal units and compared with the retail price of gasoline, the cost of such wood fuel F turns out to be equivalent to about 20 cents a gallon. Furthermore, there is no sales tax nor highway tax added, as with gasoline, so that the cost of such wood fuel is still much less than the dollar and up a gallon we are presently paying for gasoline fuel. As a consequence, wood is not only an alternate and renewable fuel but it is also economical and much safer to handle than flammable and explosive gasoline.

Conventional gas turbines require a certain time to build up adequate pressure, and this is detrimental to stop-and-go traffic. As explained in my U.S. Pat. No. 4,211,930, battery power is used to overcome this problem.

The wood chips or blocks used to heat the compressed air and to produce the power gas in each combustion chamber 28 can be the waste of the timber industry which, at the present time, is completely lost. The U.S. logging industry estimates this waste at 120 million dry tons annually. This waste could produce the equivalent energy in the present power plant of 400,000 barrels of oil daily.

It is ordinarily assumed that a pound of dynamite possesses more energy than a pound of wood, whereas the reverse is actually the case. A pound of dynamite holds only half the energy of a pound of wood. All that dynamite does is release its energy in a split second, whereas slow-burning wood takes a much longer time to do so. Moreover, 2.5 pounds of wood contains exactly the same amount of energy as one pound of gasoline.

The fuel F may also consist of the processed cellulose waste material known as "Biomass" fuel which includes not only wood scraps and sawdust but also sugar cane, bamboo, chaparrall, corn cobs and eucalyptus preferably made into highly-compressed fuel briquettes. One such continuous-extrusion machine for preparing fuel briquettes from such waste materials is described in an article in the journal *Industrial Research Development* on page 37 of the December 1978 issue entitled "Machine Cuts Biomass Fuel Cost." This machine is said to convert wood waste and "every known kind of biomass residue" into such briquettes which burn with very little ash and which make use of waste material which is otherwise almost always thrown away, as by being buried or burned.

What is claimed is:

1. A portable slow-burning solid fuel power plant system for a hybrid vehicle, said system comprising:
    combustion receptacle means having a combustion chamber therein adapted to burn and convert pieces of slow-burning solid fuel into a pressurized power gas, said combustion receptacle means having an air inlet and a power gas outlet,
    a power-gas-operated turbine having a power gas inlet portion and an exhaust gas outlet portion and a rotary power output member,
    conduit means for conveying power gas from said outlet of said combustion receptacle means to said inlet portion of said turbine,
    an electrical storage device,
    an alternator having a rotary power input member and electric current output terminals adapted to deliver the electric current generated by said alternator to said electrical storage device in response to its drive by said power-gas-operated turbine,
    a speed reducer operatively connecting said rotary power output member of said turbine to said rotary power input member of said alternator,
    means for selectively supplying a combustible starting fluid to said combustion receptacle means,
    means associated with said combustion receptacle means for controllably igniting said combustible starting fluid, and
    means responsive to the amount of charge contained in said storage device for supplying air under pressure to said combustion receptacle air inlet whenever said storage device is not in its fully charged condition.

2. The system as defined in claim 1 wherein said starting fluid is a combustible gas.

3. The system as defined in claim 1 wherein said air supplying means is a power-driven air compressor.

4. The system as defined in claim 1 wherein said combustion receptacle means includes two combustion receptacles for alternate operation, wherein said air-supplying means also includes separate independent air supply conduits extending from said air compressor to said combustion receptacle, wherein said conduit means includes separate independent power gas conduits extending from said power gas outlets of said combustion receptacles, and wherein means is provided for selectively supplying compressed air to one of said combustion receptacles while shunting off the supply of compressed air to the other combustion receptacle.

5. The system as defined in claim 4 wherein said means for selectively supplying a starting fluid includes means for selectively feeding said starting fluid to one of said combustion receptacles while cutting off the supply of said starting fluid to the other of said combustion receptacles.

6. The system as defined in claim 4 wherein said selectively-supplying means for compressed air includes a valve device communicating alternately and selectively with one of said air supplying conduits while cutting off communication with the other of said air-supplying conduits.

7. The system as defined in claim 1 wherein said combustion receptacle means includes a vertically-elongated pressure vessel with a pressure relief valve in the upper portion thereof and with a grate structure in the lower portion thereof and with an ash receiver below said grate structure.

8. The system as defined in claim 1 wherein a starting fluid burner is disposed in said combustion receptacle means, wherein a starting fluid container is disposed remote from said burner, and wherein conduit means is provided for conveying said starting fluid from said container to said burner.

9. The system as defined in claim 8 wherein said igniting means includes an electrically-energized igniting plug such as a spark plug or a platinum wire glow plug disposed adjacent said burner and controllably connected to the storage device.

10. The system as defined in claim 7 wherein said ash receiver has a closure member movably mounted on said pressure vessel at the bottom thereof and selectively movable between closed ash-retaining and open ash-ejecting positions.

11. A portable slow-burning solid-fuel power plant system suitable for recharging an electrical storage device for a hybrid vehicle said system comprising:
    combustion receptacle means having a combustion chamber therein adapted to burn and convert pieces of slow-burning solid fuel into a pressurized power gas;

said combustion receptacle means having an air inlet and a power gas outlet;

a power-gas-operated turbine having a power gas inlet portion and an exhaust gas outlet portion and a rotary power outlet member;

an electrical storage device, conduit means for conveying power gas from said outlet of said combustion receptacle means to said inlet portion of said turbine;

a two-phase alternator having a rotary power input member and electric output terminals adapted to deliver the electric current generated by said alternator to said electrical storage device in response to its drive by said power-gas-operated turbine;

a speed reducer operatively connecting said rotary power output member of said turbine to said rotary power input member of said alternator;

means for selectively supplying a combustible starting fluid to said combustion receptacle means;

means associated with said combustion receptacle means for igniting said combustible starting fluid;

means for supplying air under pressure to said combustion receptacle air inlet wherein said air supply means includes a drive motor controllably energized from said storage device, the drive motor driving the air supply means to supply the pressurized air, and motor control means for controlling the energization of the drive motor, said motor control means allowing said storage device to energize the drive motor, said storage device not being fully charged.

12. The system as defined in claim 11 wherein said motor control means includes circuit means responsive to a combustion chamber pressure of a predetermined value to allow the drive motor to drive air supply means, to raise the pressure within the combustion receptacle means to a pressure greater than a lower predetermined pressure value but less than an upper predetermined pressure value.

* * * * *

UNITED STATES PATENT AND TRADEMARK OFFICE
CERTIFICATE OF CORRECTION

PATENT NO. : 4,423,332

DATED : December 27, 1983

INVENTOR(S) : Werner H. Fengler

It is certified that error appears in the above-identified patent and that said Letters Patent is hereby corrected as shown below:

Column 2, line 63, "subidivided" should read -- subdivided --.

Column 3, lines 17, 18 and 19, "which may consist of an electric" should appear once.

Column 5, line 56, "relay" should read -- rely --.

Column 6, line 54, "chamger" should read -- chamber --.

Column 8, line 28, "shunting" should read -- shutting --.

Signed and Sealed this

Eighteenth Day of September 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,423,332
DATED : December 27, 1983
INVENTOR(S) : Werner H. Fengler It is certified that error appears in the above-identified patent and that said Letters Patent is hereby corrected as shown below:

Column 2, line 63, "subidivided" should read — subdivided —.

Column 3, lines 17, 18 and 19, "which may consist, for example, of an electric" should appear once.

Column 5, line 56, "relay" should read — rely —.

Column 6, line 54, "chamger" should read — chamber —.

Column 8, line 28, "shunting" should read — shutting —.

This certificate supersedes certificate of correction issued September 18, 1984.

Signed and Sealed this

Twenty-second Day of October 1985

[SEAL]

Attest:

DONALD J. QUIGG

Attesting Officer

Commissioner of Patents and
Trademarks—Designate